United States Patent [19]

Lapp, Jr. et al.

[11] Patent Number: 5,122,218
[45] Date of Patent: Jun. 16, 1992

[54] TUBULAR PLASTIC CRIMPING METHOD AND APPARATUS

[75] Inventors: John K. Lapp, Jr., New Holland; Lloyd M. Martin, Ephrata; Lloyd J. Glick, Bird-In-Hand, all of Pa.

[73] Assignee: Quality Fencing & Supply, Inc., New Holland, Pa.

[21] Appl. No.: 539,183

[22] Filed: Jun. 18, 1990

[51] Int. Cl.⁵ .............................................. B32B 31/00
[52] U.S. Cl. .................................... 156/350; 156/198; 156/308.4; 493/156; 493/308
[58] Field of Search ................... 156/350, 308.4, 198, 156/357, 349, 199, 200; 53/373.2, 374.5, 374.3, 374.6; 493/156, 308, 129, 164

[56] References Cited

U.S. PATENT DOCUMENTS

| | | | |
|---|---|---|---|
| 3,445,922 | 5/1969 | Leghorn | 29/527.6 |
| 3,765,144 | 10/1973 | Schiesser | 53/39 |
| 4,515,648 | 5/1985 | Kolbe et al. | 156/196 |
| 4,820,364 | 4/1989 | Graham | 156/69 |

Primary Examiner—David A. Simmons
Assistant Examiner—Robert Barker
Attorney, Agent, or Firm—William B. Noll

[57] ABSTRACT

This invention is directed to apparatus, and to the method for crimping and sealing the end of a thin walled, inflexible plastic tubing member, such as made from vinyl, PVC and the like, where such end preferably exhibits a uniquely configured end design in the shape of an arrowhead. The apparatus includes a frame having mounted thereon a carousel for operating in an intermittent, rotational mode among plural operating stations arranged in a circular sequence. The stations are arranged sequentially to receive the tubular plastic member, heat one end thereof to a preferred temperature between about 200° to 212° F. for a period of about 5 to 15 secounds, apply a plastic compatible adhesive to the inner wall of the heated one end, and crimp and seal said one end by applying a compressive force to the one end to bring opposing walls thereof into sealing engagement, while maintaining such compressive force for a sufficient time to effect the sealing of the one end. To effect the crimping and sealing on a continuous basis, plural molding stations are arranged along a reciprocating rail, where said rail is tangentially arranged relative to the rotating carousel. By the use of a suitable microprocessor, the intermittent rotation and work of the carousel may be synchronized with the reciprocating rail to bring each of the plural molding stations in a predetermined sequence into registry with the crimp and seal station.

10 Claims, 6 Drawing Sheets

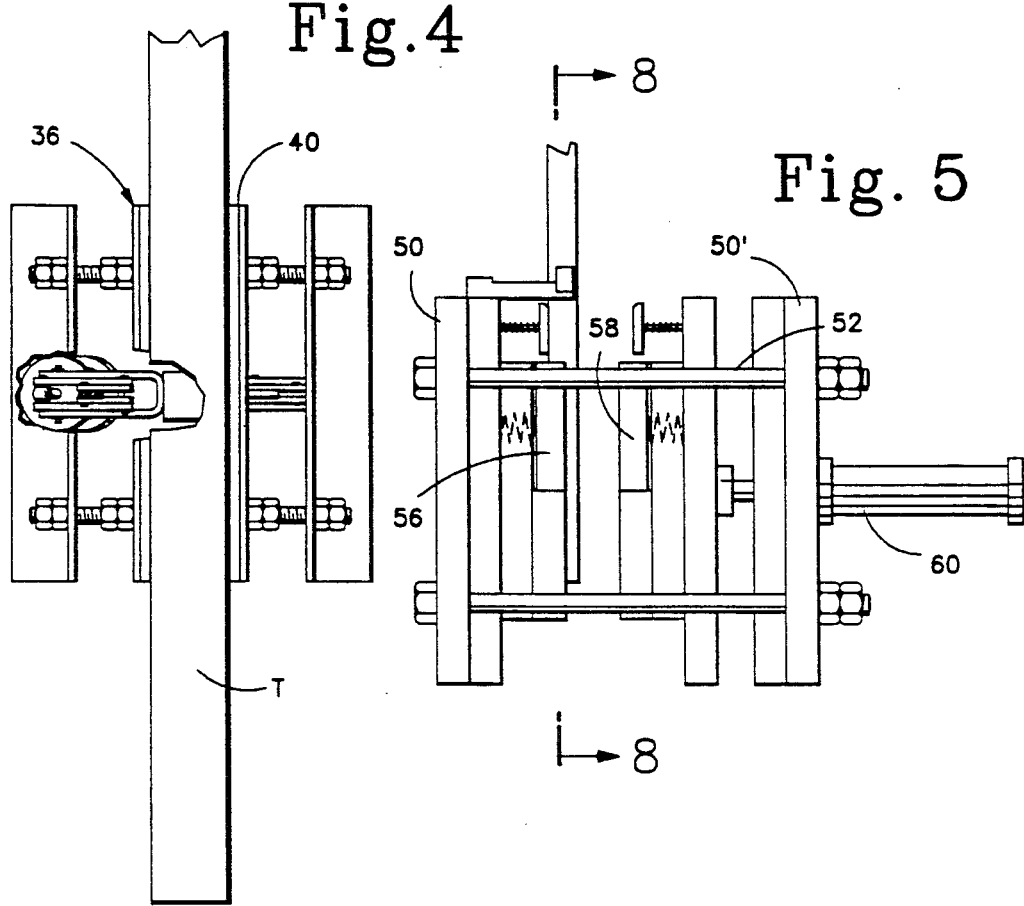
Fig. 4
Fig. 5
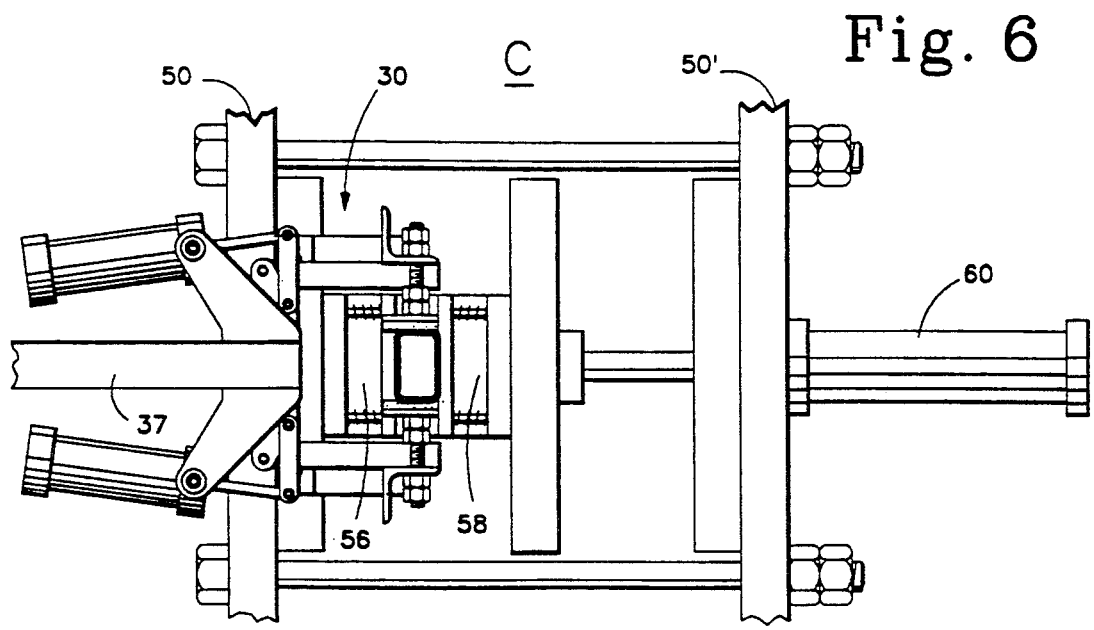
Fig. 6

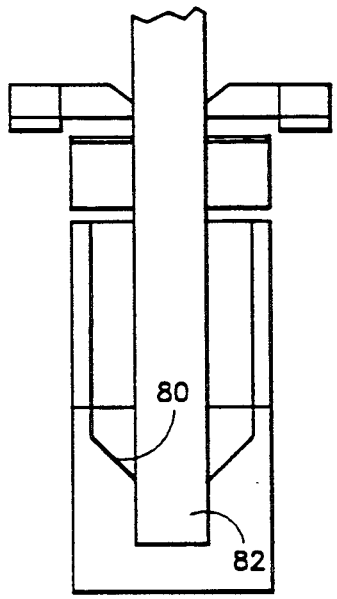 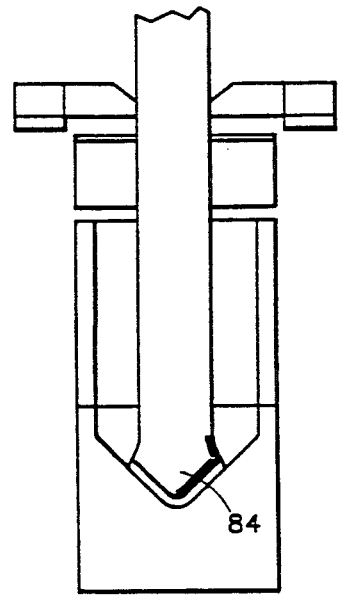
Fig. 8              Fig. 9
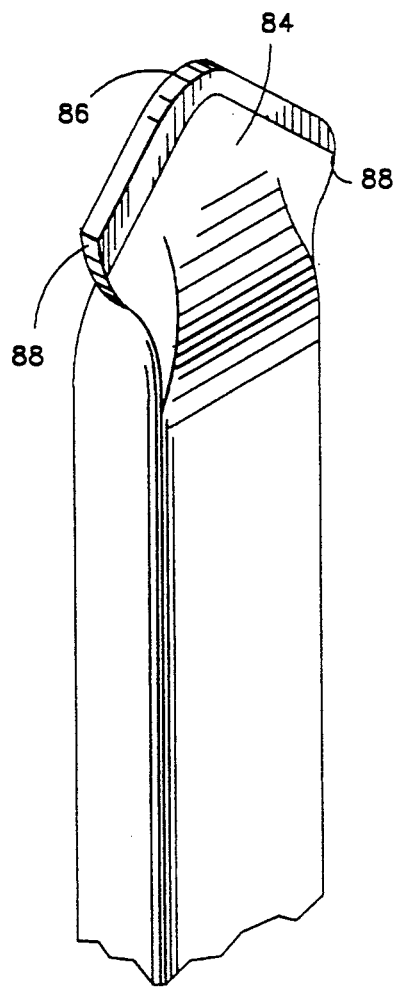
Fig. 10

TUBULAR PLASTIC CRIMPING METHOD AND APPARATUS

BACKGROUND OF THE INVENTION

This invention is directed to apparatus, and to the method for crimping and sealing the end of a thin walled, inflexible plastic tubing member, such as made from vinyl, PVC and the like, where such end preferably exhibits a uniquely configured end design in the shape of an arrowhead. An integral step of the method hereof includes the controlled heating of the end of such tubing member prior to crimping and sealing. While the invention has broad application, a particular use thereof may be the formation of a stake element for a picket fence, the design of which is illustrated in copending patent application, Ser. No. 479,038, filed Feb. 12, 1990, by one of the inventors hereof.

With the current and large use of plastic for containment applications, there is a quantity of information available on sealing flexible plastic film to form an enclosure. Less, however, is known about crimping and sealing a relatively rigid, thin walled plastic member as taught herein. In regard to thicker and more rigid plastic products, it is known to close plastic containers which are still in a hot state from the preceding fabrication process, such as a blowing process, by pinching the two opposite ends of the wall together by clamping jaws which also effect the welding together of these walls and the closing of the pouring aperture. Plastic containers which are no longer in a plastic or pliable condition are closed by supplying heat to the outer circumference of the aperture part or spout, for example, through clamping jaws which are used to pinch these walls together to thereby make the material of the container sufficiently plastic to cause a welding of the aperture when the clamping operation is effected. The heat requirement for sufficient plastisizing of the aperture part to be welded is relatively great. In addition, by means of the heating clamping jaws it is not possible to produce, in the aperture portion to be welded, a local weakening of the material which may be desired to form a tear line in order to facilitate the subsequent opening of the container by tearing along this line.

U.S. Pat. No. 3,765,144 to Schlesser et al teaches an improved method and apparatus to form a closure in a plastic container, for example. A critical feature thereof appears to be the use of a central heater, which enters into an aperture to heat opposite sides thereof, including means to heat the interior end, prior to flattening such end.

While the present invention is not preferably concerned with the formation of a container, it nevertheless is directed to sealing a plastic tubular member at at least one end thereof. It achieves the results through a method and apparatus that is not found in the prior art, nor in related art. The features of this invention will become more apparent from a reading of the following specification, particularly when read in conjunction with the several Figures.

SUMMARY OF THE INVENTION

This invention is directed to apparatus, and to the method for operating same, for crimping and sealing the end of a hollow, thin walled, relatively rigid, tubular plastic member. Such apparatus includes a frame having mounted thereon a carousel for operating in an intermittent, rotational mode among plural operating stations in a circular sequence. The stations are arranged sequentially to receive said tubular plastic member, heat one end thereof to a preferred temperature between about 200° to 212° F. for a period of about 5 to 15 seconds, apply a plastic compatible adhesive to the inner wall of the heated one end, and crimp and seal said one end by applying a compressive force to said one end to bring opposing walls thereof into sealing engagement, while maintaining such compressive force for a sufficient time to effect the sealing of said one end. To effect the crimping and sealing on a continuous basis, plural molding stations are arranged along a reciprocating rail, where said rail is tangentially arranged relative to the rotating carousel. By the use of a suitable microprocessor, the intermittent rotation and work of the carousel may be synchronized with the reciprocating rail to bring each of the plural molding stations in a predetermined sequence into registry with the crimp and seal station.

BRIEF DESCRIPTION OF DRAWINGS

FIG. 4 is a partial side view, taken along line 4—4 of FIG. 3, of one pair of a set of clamping jaws associated with said carousel.

FIG. 5 is a partial side view of a crimping station in tangential registry with the carousel.

FIG. 6 is a partial top view of the clamping mechanism illustrated in FIG. 5.

FIG. 8 is a partial sectional view of the workpiece and mold prior to crimping.

FIG. 9 is a partial sectional view, similar to FIG. 8, after the crimping step.

FIG. 10 is a perspective view of a preferred sealed and crimped workpiece, such as a picket fence stake, manufactured by the present invention.

DETAILED DESCRIPTION OF PREFERRED EMBODIMENT

Figure 1:
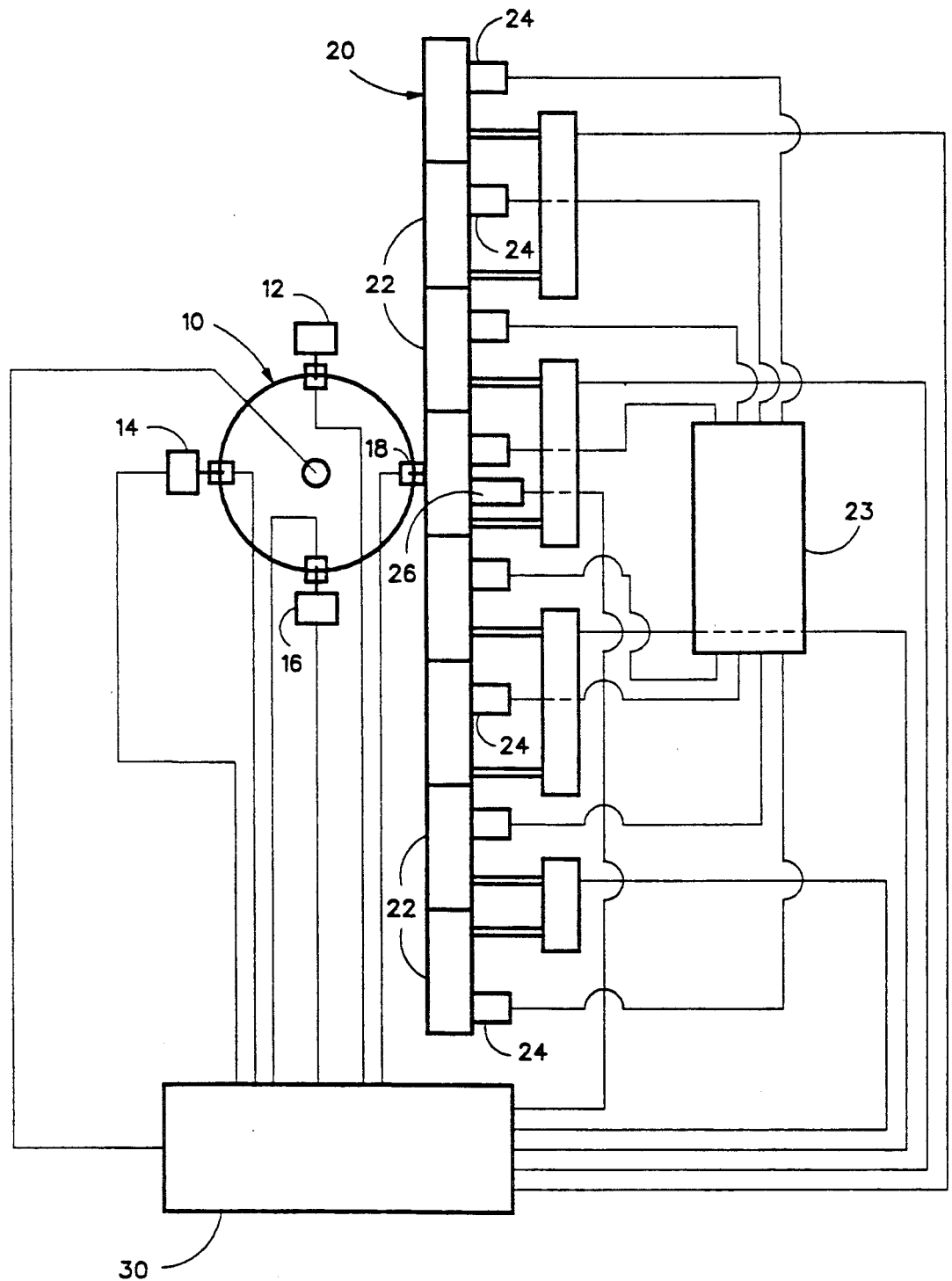
FIG. 1 is a schematic representation of the system of this invention illustrating the various elements forming the apparatus hereof.

Turning first to FIG. 1, there is illustrated schematically the system of this invention. Centrally depicted therein is carousel 10, or indexer, which is adapted to operate in an intermittent, rotational mode among plural operating stations in sequence, four being shown in FIG. 1. A first such station is the feed or product receiving station 12, followed sequentially by the heating station 14, adhesive application station 16, and crimping station 18.

Arranged tangentially to said carousel 10, at crimping station 18, is a rail 20 containing plural molding stations 22, operating through a central molding control unit 23, where each station is provided with a crimping actuating hydraulic cylinder 24 for molding purposes, and is equipped with a sensor arm, the full function of which will become apparent hereinafter. Cooperating with each said sensor arm is a sensor contact 26 located at the crimping station 18. The rail 20, which shifts or reciprocates to bring each molding station 22 into registry with the crimping station 18, is activated by plural hydraulic cylinder 28, the stroke of which is dimensioned to laterally shift such molding stations a predetermined lateral distance.

The control, operation and coordination of the respective components is achieved by means of a microprocessor 30. A suitable microprocessor is a programmable logic controller (PLC) manufactured by Toshiba, and identified as Prosec EX100.

Figure 2:
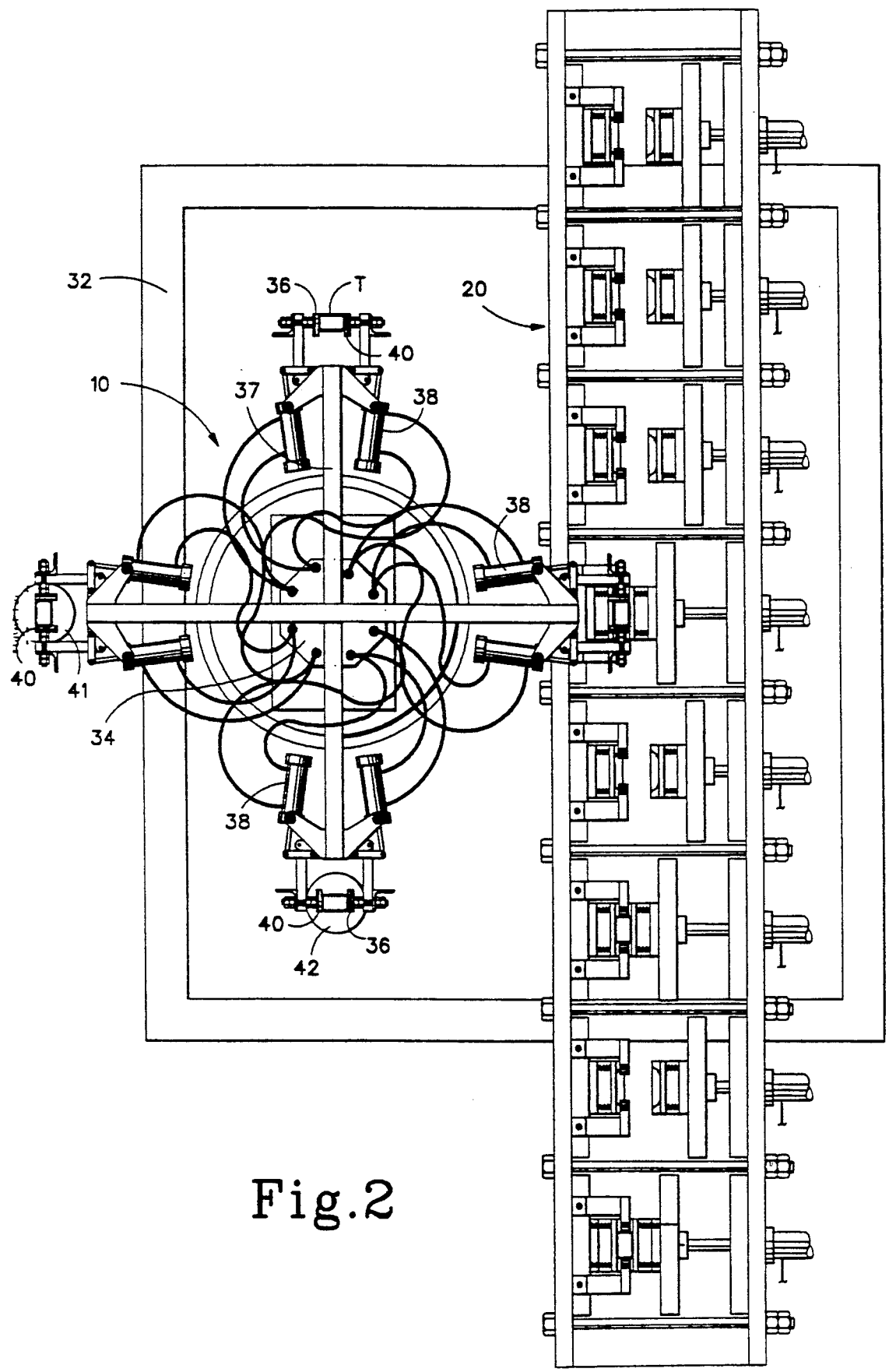
FIG. 2 is a top view of the intermittent, rotating carousel in relation to a tangentially disposed reciprocating rail carrying a plurality of work stations.

In FIG. 2, the carousel 10 is shown as being mounted on a frame 32. The carousel 10 is essentially an indexer 34 adapted to rotate, for this preferred embodiment, in a counterclockwise direction, with a timed pause at each of the four stations 12, 14, 16, and 18. Additionally, the indexer 34 includes a central piston (not shown) to rise and descend to effect work upon the workpieces at each of said stations.

The carousel 10 is further provided with plural clamping jaws 36, one pair for each of the number of stations included therein, opposing jaws 36 being mounted thereon by cross support arms 37. The jaws 36 are each individually operated by a pair of air cylinders 38 to cause the grips 40 to open and close upon a workpiece disposed therebetween, where the action thereof is normal to such workpiece. For purposes of this preferred embodiment, the workpiece is a thin walled, inflexible plastic tubing member, such as made from vinyl, PVC and the like.

The uppermost station containing tubular member T of FIG. 2 is the feed or product receiving station. Between the jaws 36, in an opened and lowered position, a tubular member T is positioned. The jaws 36 may then be caused to move together into clamping engagement with such member. The indexer 34 is raised and rotated 90° to position the tubular member over a heating pot 41, i.e. leftmost station. As will be examined in more detail hereinafter, the indexer 34 then lowers the tubular member into said heating pot, typically maintained at a temperature of about 200° to 212° F., where the end of such member is held for a predetermined period of time. It will be recognized that as a tubular member T is being heated, a new tubular member is positioned in the product receiving station 12, thus allowing for continuous operation of the apparatus. Thereafter, the indexer 34 is raised and again rotated 90° whereupon the tubular member is positioned above a second pot, this time an adhesive application pot 42 at the lowermost station, whereupon the end of the heated tubular member is lowered into such pot to receive adhesive through the application of a swab inserted into the hollow tubular member. Again, the indexer is raised and rotated 90° to position the workpiece at the crimping station 18. Concurrently with this operation, other tubular members are being processed in similar fashion.

Arranged to shift or reciprocate in a direction along a line tangent to said crimping station 18 is a rail 20. Mounted on said rail, as best seen in FIG. 3, are a plurality of molding stations 22, identified as "A" through "H".

The rail 20 is characterized by a pair of spaced apart, parallel mounting plates 50,50' joined together by threaded rods 52, where adjacent rods 52 define the individual molding stations 22. Operating within the space 54 is a fixed mold half 56 and a complementary, movable mold half 58, the latter being operated by hydraulic cylinders 60 mounted on rear plate 50 and operable in a direction toward the front plate 50', see FIG. 6. More will be discussed about this later.

Figure 3:
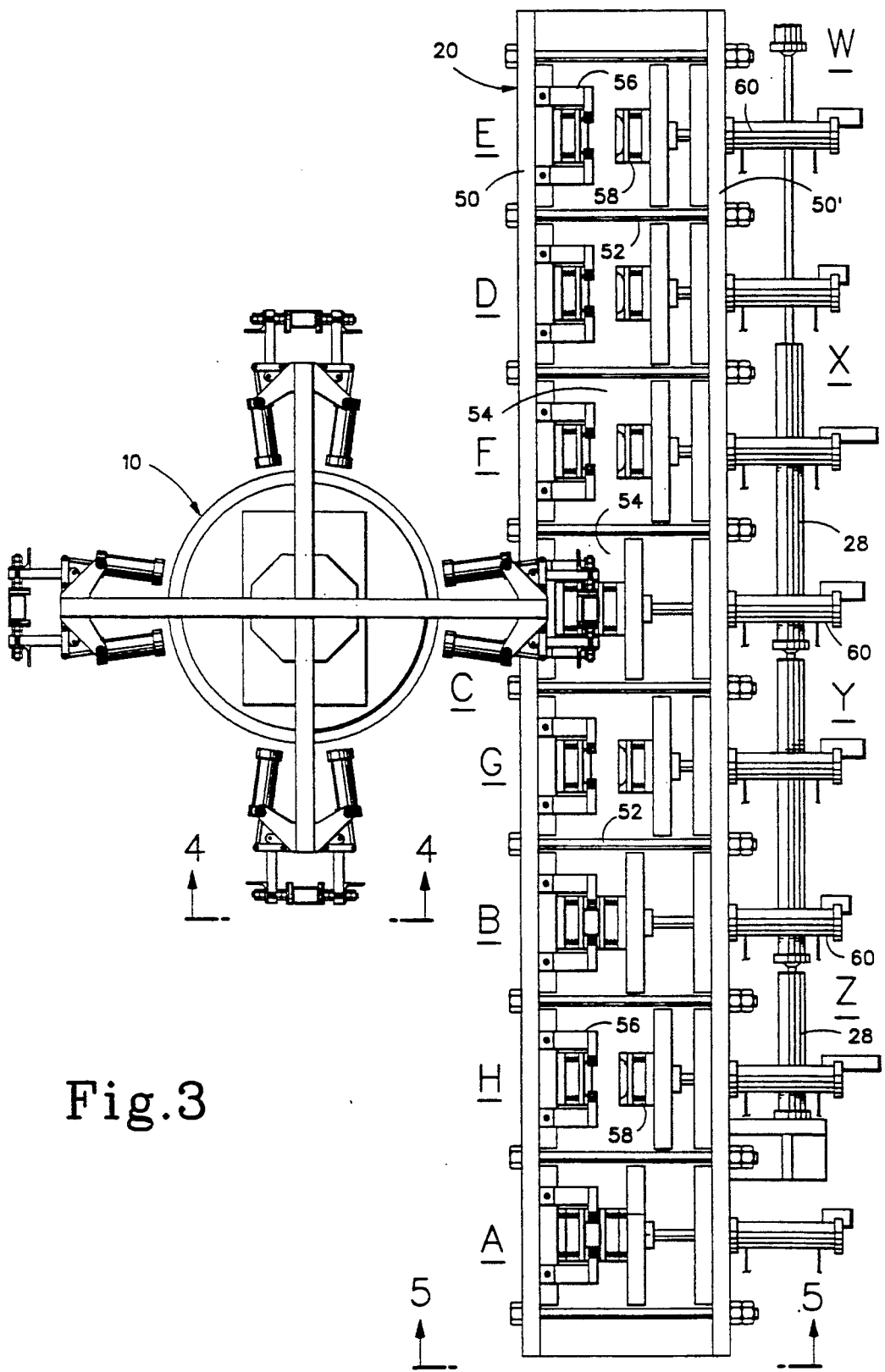
FIG. 3 is a top view illustrating details of said reciprocating rail.

Movement of the rail 20 is achieved by the plural hydraulic cylinders 28, identified in FIG. 3, as "W,X,Y" and "Z". By the selective extension and/or retraction of one or more such cylinders, it is possible to bring each of the molding stations "A" through "H" into registry with the crimping station 18. In this preferred embodiment three full cylinders (W-X-Y) and a half cylinder (Z) are employed in the following manner. A full cylinder, as used herein, means the stroke thereof is twice the lateral dimension or "2S" (distance between adjacent rods 52 equals "S") of each molding station, whereas the stroke of cylinder "Z" is equal to such lateral dimension, or "S".

a) With all cylinders retracted, station "A" is in registry with crimping station 18.
b) By extending only cylinder "W", station "B" is in registry with crimping station 18.
c) With "W" extended, extension of "X" will bring "C" into registry with crimping station 18.
d) With "W" and "X" extended, extension of "Y" will bring "D" into registry with crimping station 18.
e) With "W", "X" and "Y" extended, extension of "Z", the half cylinder, will bring "E" into registry with crimping station 18.
f) By the selective and sequential retraction of cylinders "W", "X", "Y" and finally "Z", the further stations of "F", "G", "H" and "A", respectively, are brought into registry with the crimping station 18, where the operation may be repeated.

By the use of plural molding stations 22, as described above, it is possible to operate the system in a continuous manner while allowing an extended full cycle time for each sealed and crimped workpiece to be held within the mold. By way of example, if a full cycle time is about one minute, the rate of production would be on the order of about 7½ seconds (⅛ of one minute). This will become clearer in the discussion of the preferred example.

FIGS. 4, 5 and 6 reveal further details of the clamping jaws 36, and molding mechanism 56, 58, 60. FIG. 6, for example, is a top plan view showing a workpiece in a clamped position. That is, the cylinder 60 has been extended to bring mold halves 56, 58 into engagement with one another.

Figure 7A:
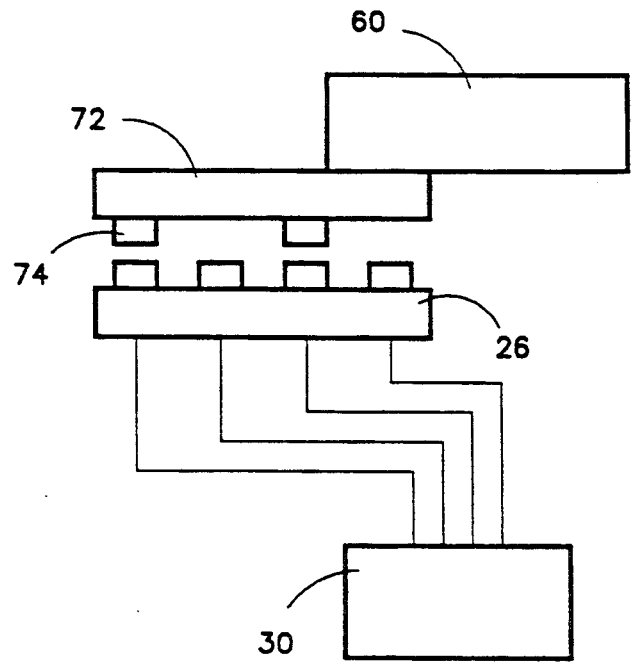
FIGS. 7A and 7B are simplified illustrations showing two exemplary arrangements for sensing the position of the rail at the selected crimping station.
Figure 7B:
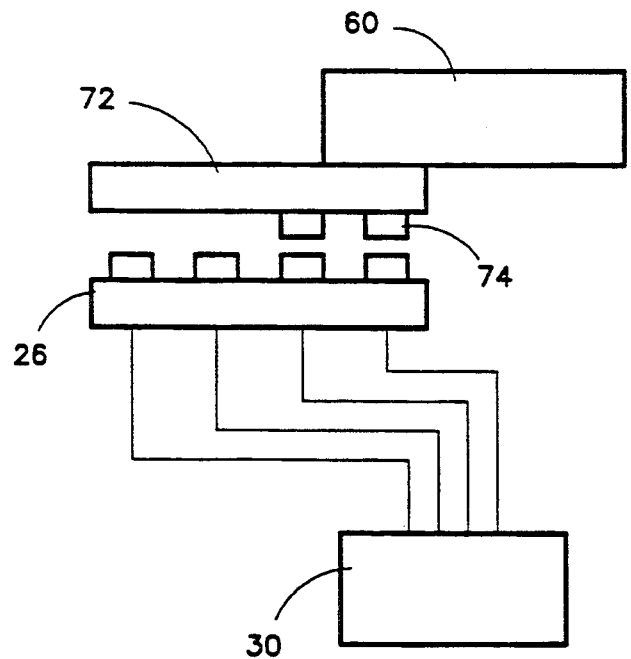

An additional feature of each molding station 22 is the provision of a sensor contact 26 located at and associated with the crimping station 18, FIGS. 7A and 7B. The sensor contact is equipped with plural, upstanding electrical contacts 70, where such contacts may be individually programmed or programmed in pairs for sensing purposes, as hereinafter explained.

Positioned to cooperate with the fixed sensor contact 26 are individual sensor arms 72 projecting rearwardly from the cylinders 60. Each such sensor arm 72 is provided with an individualized or paired contacts 74 which are distinct from one another. FIGS. 7A and 7B are just two examples of a contact 74 pattern unique to a given molding station 22. By way of example, the following represent some individualized contact combinations:

| Station | Sensor Contacts |
| --- | --- |
| A | 1 |
| B | 2 |
| C | 3 |
| D | 4 |

| Station | Sensor Contacts |
|---------|-----------------|
| E | 1-2* |
| F | 1-3 |
| G | 2-3 |
| H | 2-4* |

*See FIGS. 7A for 2-4, and 7B for 1-2.

In any case, by this system there is provided a unique manner of sensing the position of the reciprocating rail relative to the crimping station. Further, by such sensing mechanism, the apparatus may be arranged to allow for the timed release of the crimped and sealed workpiece from the mold halves 56, 58.

While not forming a part of this invention, any suitable conveyor means or chute may be provided below the molding stations 22 to receive and transport the released workpiece.

To achieve the unique end design for the crimped and sealed end of the tubular member T, such member, having its end heated and rendered soft, enters the crimping station 18 between mold halves 56, 58. FIG. 8 shows tubular member T in front of mold half 58 and projecting below the molding cavity 80. As the mold halves 56, 58 are brought into engagement, the end 82 is cut off whereby the member end 84 (FIGS. 9 and 10) is crimped and conforms to the configuration of cavity 80. As more clearly shown in FIG. 10, the leading edge 86 is sealed revealing the pair of winged portions 88.

In the preferred practice of this invention, tubular members of polyvinylchloride (PVC) were selected having the outside dimensions of about 1.5×0.875 inches, with a wall thickness of about 0.0625 inches. In sequence, as practiced on the apparatus hereof, the ends of such members were first heated in hot water, maintained at about 205° F., for about 7.5 seconds. Thereafter, a swab containing a PVC solvent cement, such as Titeseal by Radiator Specialty Company, Charlotte, N.C., an adhesive containing tetrahydrofuran, cyclohexanone, butanone and acetone, and meeting ASTM D-2564, was inserted into such heated end. Finally, the tubular member was subjected to a crimping and sealing step in which a compressive force was maintained thereon for about one minute. During such time, the operation was repeated resulting in the crimping and sealing of eight tubular members having an end configuration in the manner shown in FIG. 10.

We claim:

1. Apparatus for crimping and sealing the end of a hollow, thin walled, relatively rigid, tubular plastic member, comprising
   a frame having mounted thereon a carousel for operating in an intermittent, rotational mode among plural operating stations, where such stations respectively arranged to sequentially receive said tubular plastic member; heat one end thereof; apply adhesive to the inner wall of said one end; and crimp and seal said one end;
   a rail tangentially arranged relative to said carousel having mounted thereon plural molding stations adapted to reciprocate along said rail in a predetermined sequence to bring each said molding station into registry with said crimp and seal station; and
   a microprocessor to coordinate the rotation of said carousel with each said plural molding station along said reciprocating rail.

2. The apparatus according to claim 1 wherein said carousel includes means to raise and lower said tubular plastic member at each operating station.

3. The apparatus according to claim 1 wherein said rail includes plural means for shifting said molding stations a predetermined distance.

4. The apparatus according to claim 3 wherein said shifting means comprise hydraulic cylinders having a fixed stroke length.

5. The apparatus according to claim 4 wherein the number of hydraulic cylinders is equal to one-half the number of molding stations.

6. The apparatus according to claim 5 wherein each molding station has a lateral dimension "S", one of said hydraulic cylinders has a stroke length equal to "S", and the remaining hydraulic cylinders have a stroke length equal to "2S".

7. The apparatus according to claim 1 including sensing means to determine the position of the reciprocating rail relative to said crimping station.

8. The apparatus according to claim 1 including a pair of complementary mold members at each said molding station.

9. The apparatus according to claim 8 wherein one of each said pair of mold members is fixed and the other movable in a direction normal to the direction of movement of said rail.

10. The apparatus according to claim 9 wherein each said movable mold member is separately operable.

* * * * *